United States Patent
Montague et al.

(10) Patent No.: US 12,066,554 B2
(45) Date of Patent: Aug. 20, 2024

(54) SYSTEMS AND METHODS FOR VERIFYING A DEVICE LOCATION

(71) Applicant: Serelay Limited, London (GB)

(72) Inventors: Clinton Montague, Bath (GB); Roy Azoulay, Oxford (GB); Ian Field, Reading (GB)

(73) Assignee: Serelay Limited, London (GB)

( * ) Notice: Subject to any disclaimer, the term of this patent is extended or adjusted under 35 U.S.C. 154(b) by 515 days.

(21) Appl. No.: 17/479,783

(22) Filed: Sep. 20, 2021

(65) Prior Publication Data

US 2023/0092670 A1  Mar. 23, 2023

(51) Int. Cl.
*H04W 4/02* (2018.01)
*G01S 19/40* (2010.01)
*H04W 4/029* (2018.01)
*H04W 64/00* (2009.01)

(52) U.S. Cl.
CPC ............. *G01S 19/40* (2013.01); *H04W 4/029* (2018.02)

(58) Field of Classification Search
CPC ........ G01S 19/40; G01S 19/42; G01S 19/396; H04W 4/029
See application file for complete search history.

(56) References Cited

U.S. PATENT DOCUMENTS

| | | | |
|---|---|---|---|
| 2019/0360804 A1* | 11/2019 | Dormody | G01C 5/06 |
| 2020/0379122 A1* | 12/2020 | Tontiruttananon | G01S 19/215 |
| 2022/0283313 A1* | 9/2022 | Lekutai | H04W 76/10 |
| 2022/0350030 A1* | 11/2022 | Shuman | G01S 5/0072 |

* cited by examiner

*Primary Examiner* — Moustapha Diaby
(74) *Attorney, Agent, or Firm* — Fresh IP PLC; Clifford D. Hyra; Micah Gunn

(57) ABSTRACT

A method of verifying a device location includes receiving a provisional location for a first device, setting a baseline location confidence value for the provisional location, determining a first network environment of the first device, and receiving one or more location reports each including a location for another device in the first network environment. For each received location report, the location in the location report is compared with the provisional location of the first device and a distance is calculated; and an adjustment to the location confidence value of the first device is calculated based on the calculated distance. An output location confidence value is generated for the provisional location of the first device based on the baseline location confidence value and the adjustment calculated for each received location report.

22 Claims, 5 Drawing Sheets

SYSTEMS AND METHODS FOR VERIFYING A DEVICE LOCATION

FIELD OF THE INVENTION

This invention relates in general to the field of device locating and, in particular, to the verification of a device location based on the location reports of other devices.

BACKGROUND OF THE INVENTION

It is known for devices to determine their geographical location for a variety of purposes e.g. navigation and metadata tagging of captured media. For example, devices may determine their location using a Global Positioning System (GPS).

However, it is known that a device location can be fabricated or "spoofed" using hardware or software. For example, artificial GPS transmissions can be generated by an external transmitter, to cause a GPS receiver to report an incorrect location, or a software tool can be configured to override the native functionality of a device by ignoring incoming GPS signals and outputting a spoofed location. There are generally no safeguards against false attribution of time and place to a device. However, in some cases verifying that the reported time and place of a device is accurate may be critical.

For example, when capturing a photograph, many devices will store the current time and date, and coordinates of the physical location of the device when the photograph was captured. News organisations often receive submitted photographs and videos from members of the public, but these organisations have to be careful to verify the authenticity of what they are being presented with—in particular that the photograph (for example) really was taken at the time and place claimed. In the past, even reputable news organisations have fallen victim to falsified submitted photographs and published them as genuine.

Even if a mechanism exists to ensure that the current location of the device is stored with the photograph, and even if there is a mechanism to prevent later tampering with that location metadata, there is a problem that the device location itself may not be properly verified.

As such, there is a need to improve the verification of a device location. The present invention aims to address this need.

SUMMARY OF THE INVENTION

According to a first aspect of the present invention, there is provided a method of verifying a device location according to claim 1.

According to a second aspect of the present invention, there is provided a computer-readable medium according to claim 19.

According to a third aspect of the present invention, there is provided a location verification module according to claim 20.

According to a fourth aspect of the present invention, there is provided a mobile device according to claim 21.

According to a fifth aspect of the present invention, there is provided a server according to claim 22.

Optional features are as set out in the dependent claims.

BRIEF DESCRIPTION OF THE DRAWINGS

For a better understanding of the present invention and to show more clearly how it may be carried into effect, reference will now be made by way of example only, to the accompanying drawings, in which.

DETAILED DESCRIPTION OF THE INVENTION

The present invention relates to a processing apparatus and a method for device location verification. In particular, a processing method is applied to a provision location provided by a device to generate a location confidence value for the provision location.

Figure 1:
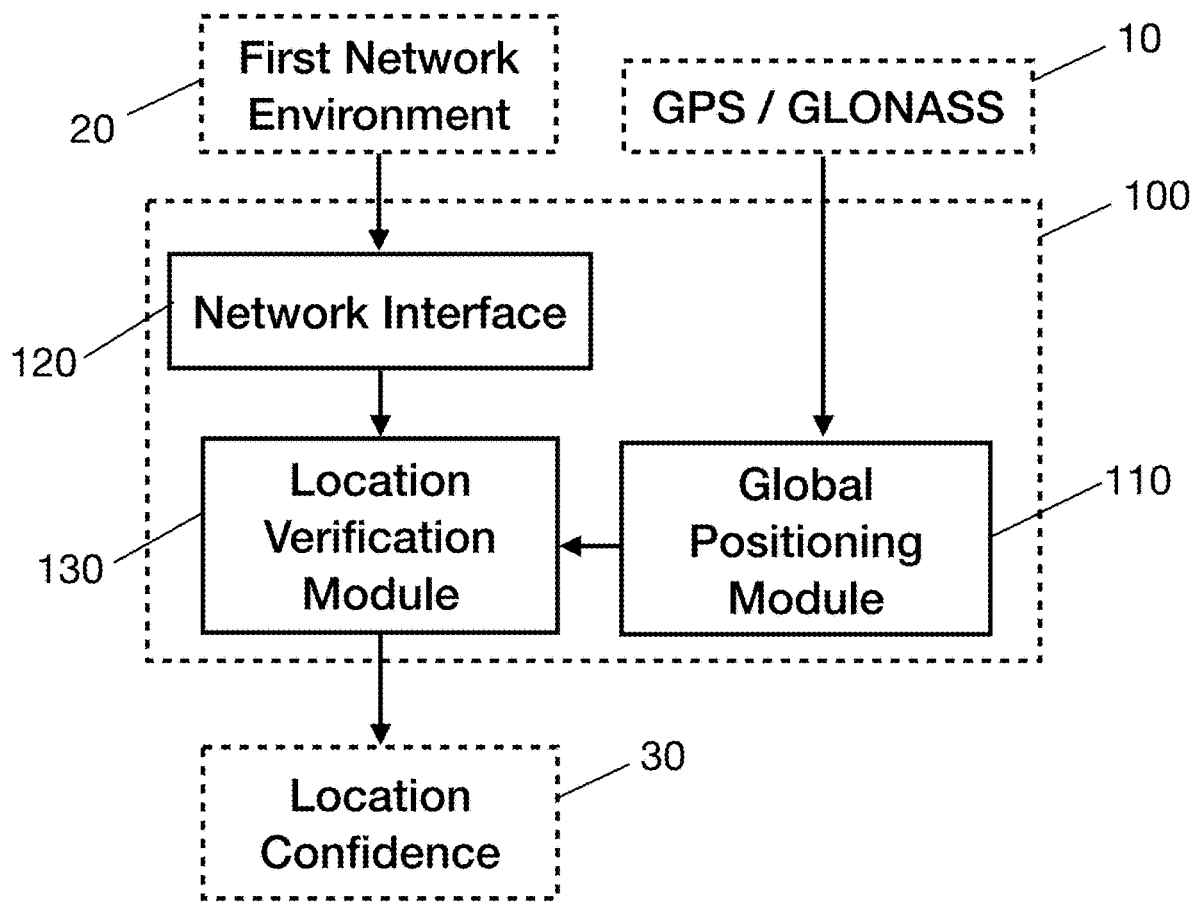
FIG. 1 is a schematic diagram showing a mobile device according to an embodiment.
Figure 2:
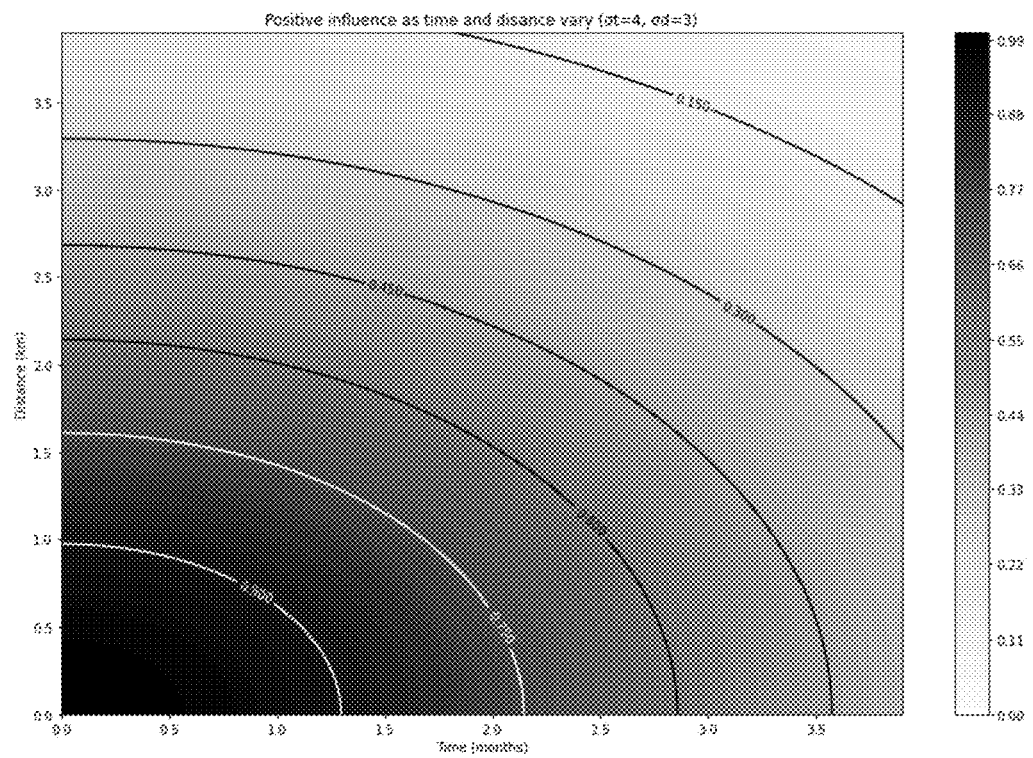
FIG. 2 is a plot showing a positive impact function according to an embodiment.

FIG. 1 of the accompanying drawings shows a schematic diagram of a mobile device 100 according to an embodiment. The mobile device 100 comprises a global positioning module 110, a network interface 120 and a location verification module 130.

The global positioning module 110 is configured to determining a provisional location for the mobile device 100. In some examples, the global positioning module 110 may be a Global Positioning System (GPS) or Global Navigation Satellite System (GLONASS) module configured to communicate with a constellation of GPS/GLONASS satellites 10 and determine the positional location.

The network interface 120 is configured to connect the mobile device 100 to one or more local or wide-area network environments. For example, the network interface 120 may be connected to a first network environment 20 via Bluetooth, Wi-Fi, a wired local area network or a cellular network tower.

The location verification module 130 is configured to receive the provisional location for the mobile device 100. In some examples, the provisional location may be received from the global positioning module 110. Alternatively, in some examples, the provision location may be based on, for example, a Bluetooth or Near-Field Communication (NFC) beacon or the result of an image recognition algorithm based on a captured image.

The location verification module 130 is configured to set a baseline location confidence value for the provisional location. In some examples, the baseline location confidence value may be 0. In some examples, where the location confidence value is bound to a range, e.g. between 0 and 1, the baseline value may be set as a value within the range e.g. 0.5 or 0.7. In this way, the baseline value defines an initial trustworthiness of the provisional location, with room for the location confidence value to be adjusted in a positive or negative direction. Alternatively, in some examples the baseline value may be set at the top of the range e.g. at 1. Alternatively, in some examples, an explicit baseline value may not be set, and a first adjustment to the location confidence value may be considered as the baseline.

The location verification module 130 is configured to determine a first network environment of the mobile device 100. The mobile device 100 may be connected to one or more local or wide-area network environments through the network interface 120. For example, the network interface 120 may be connected to a network via Bluetooth, Wi-Fi, a wired local area network or a cellular network tower. Where the mobile device 100 is connected to a plurality of network environments, the first network environment may be selected according to a range, number of devices, stability, mobility or any other criterion associated with the network environment.

The location verification module 130 is configured to receive one or more location reports each including a location for another device in the first network environment. In some embodiments, the location verification module 130 may receive the one or more location reports via the network interface 120. In some examples, the location report may be received with one or more additional metadata items including, for example, an associated location confidence value, a measurement time, a hardware configuration of the other device or one or more environmental parameters.

For each received location report, the location verification module 130 is configured to compare the location in the location report and the provisional location of the mobile device 100 and calculate a distance. In some examples, the distance may be calculated as a Euclidean or Pythagorean distance directly between the two locations.

For each received location report, the location verification module 130 is further configured to calculate an adjustment to the location confidence value of the mobile device 100. In some examples, the adjustment can be positive or negative. In some examples, the magnitude and direction of the adjustment can be based on the extent to which the location report supports or conflicts with the provisional location. For example, another device in the first network environment can be expected to share certain characteristics with the mobile device 100, for example, a similar geographic location or physical environment. As such, a location report having a similar geographic location to the provisional location may be said to support the provisional location. A location report having a significantly different geographic location to the provisional location may be said to conflict with the provisional location.

According to an embodiment, the adjustment is based on the calculated distance. For example, a device which reports a location at a short distance from the provisional location may provide support for the provisional location, and a device which reports a location at a long distance from the provisional location may conflict with the provisional location. In some examples, an extent or magnitude of the adjustment may be based on the calculated distance. For example, if the distance is very short, then the location report can be said to support the provisional location more strongly than if the distance is longer.

The location verification module 130 is configured to generate an output location confidence value 30 for the provisional location of the mobile device 100. According to an embodiment, the output location confidence value is based on the baseline location confidence value and the adjustment calculated for each received location report. In some examples, generating the output location confidence value comprises applying the calculated adjustment to the baseline location confidence value. In some examples, the adjustment may be added to, or subtracted from the baseline value. In some examples, a plurality of adjustments based on different location reports may be made collectively to the baseline value. In some examples, one or more adjustments may be made sequentially to the baseline value or the most recent value of the location confidence value.

In this way, it is possible to verify the provisional location provided by the mobile device 100. The output location confidence value can be adjusted based on evidence from other devices, according to whether the evidence supports or does not support the provisional location. The location confidence value can therefore enable the identification of a device reporting a false provisional location. For instance, if the mobile device 100 provides a provisional location in a certain geographical location but other devices in the same network environment have provided location reports with significantly different geographical locations, then the adjustments made for each of the other location reports will cumulatively reduce the location confidence value of the provisional location until it can be clearly identified as a false location. On the other hand, the location confidence value can identify if the mobile device 100 is reporting a trustworthy provisional location, as the adjustments made for each other location report will cumulatively support the provisional location. The generation of the output location confidence value can provide a numerical evaluation of the trustworthiness of a provisional location, which can be assessed, compared or ranked as a numerical metric.

In some embodiments, the location verification module 130 may be configured to calculate the adjustment for each location report by calculating a positive impact factor for the location report.

In this way, the location verification module 130 can assess the extent to which each other location report supports the provisional location. The adjustment for each location can account for the extent to which the location report supports the provisional location.

In some embodiments, the positive impact factor may include an exponential decay element based on the distance.

In this way, those devices which report a location closest to the provisional location can provide the strongest support for the provisional location. In some examples, a positive impact factor is based on a distance between devices which is consistent with the fact that the devices are present in the same network environment. When another device provides a location report which is very close to the provisional location, then the location report can be said to support the provisional location more strongly than a location report for a device which is further away. The exponential decay element can reflect this, by generating a larger adjustment based on the location report which is closer and a smaller adjustment for a location report which is further away.

In some examples, the exponential decay element may be based on a higher power of the distance, e.g. a square or cube of the distance. In some examples, the positive impact factor may be based on a Gaussian function. Alternatively, in some examples, the positive impact factor may include an alternative decay element, e.g. a linear decay element, polynomial decay element, logarithmic decay element, logistic decay element or any other suitable decay element or combination of decay elements.

In some embodiments, the exponential decay element may include a decay parameter (od) to alter the rate of decay based on a characteristic range associated with the first network environment 20.

In this way, the positive impact factor of the adjustment can be made consistent with the technology limitations of the first network environment 20. In some examples, where a plurality of network environments are considered, the decay parameter may allow the integration of location reports based on different network environments. In some examples, a positive impact factor is based on a distance between devices which is consistent with the fact that the devices are present in the same network environment. For example, a distance of 50 metres may strongly support the provisional location if the first network environment 20 is based on a cell tower, based on a characteristic range of the cell tower. The same distance of 50 metres may not strongly support the provisional location if the first network environment 20 is a Wi-Fi network, based on a characteristic range of the Wi-Fi network which is shorter than the cell tower. The decay parameter can reflect this, by providing a rate of decay suitable for the characteristic range of the first network environment.

In some embodiments, the location verification module 130 may be configured to calculating the positive impact factor based on a weighting factor calculated for the location report. In this way, the positive impact factor may account for other factors which affect or provide an indication of reliability for the location report. In this way, when a location report is considered to be more reliable, a larger adjustment can be made and vice versa.

In some embodiments, the weighing factor may be based on an elapsed time since the location report. In some examples, a longer elapsed time can increase the likelihood for inconsistent reports, e.g. when assumptions about the first network environment 20 are no longer valid. For example, a Wi-Fi network may be moved and re-installed at a new location, or cell tower designations may be updated or reassigned. In this way, a weighting factor based on elapsed time can account for expected inaccuracies over time.

In some examples, where a location report may be retrieved for another device currently in the first network environment 20, the location associated with the location report may have been determined by the other device at an earlier point in time. In some example, the other device may have changed location in the elapsed time since the location report. For example, a mobile device may have determined and reported its location at an earlier point in time corresponding to a previous use of a mapping application, or a previous social media check-in. In some examples, the other device may have reported a location outside the first network environment 20 before moving into the first network environment 20. In this way, a weighting factor based on elapsed time can account for an increasing uncertainty in the location report over time.

In some embodiments, the weighting factor may include an exponential time decay element based on the elapsed time. In this way, those devices which reported a location most recently can provide the strongest support for the provisional location. When a location report is very recent, then the location report can be said to support the provisional location more strongly than a location report with a longer elapsed time. The exponential time decay element can reflect this, by generating a larger positive impact factor based on a recent location report which is recent and a smaller positive impact factor for an older location report.

In some examples, the exponential time decay element may be based on a higher power of the elapsed time, e.g. a square or cube of the elapsed time. In some examples, the weighting factor may be based on a Gaussian function. Alternatively, in some examples, the weighting factor may include an alternative time decay element, e.g. a linear decay element, polynomial decay element, logarithmic decay element, logistic decay element or any other suitable decay element or combination of decay elements.

In some examples, the exponential time decay element may include a time decay parameter ($\sigma_t$) to alter the rate of decay. For example, a time decay parameter may be based on a characteristic reliability associated with the first network environment 20 e.g. reflecting a likelihood that the parameters of the first network environment 20 will have changed over time. Alternatively, a time decay parameter may be based on a characteristic motion associated with the other device, e.g. reflecting a likelihood that a location of the device will have changed over time.

Figure 3:
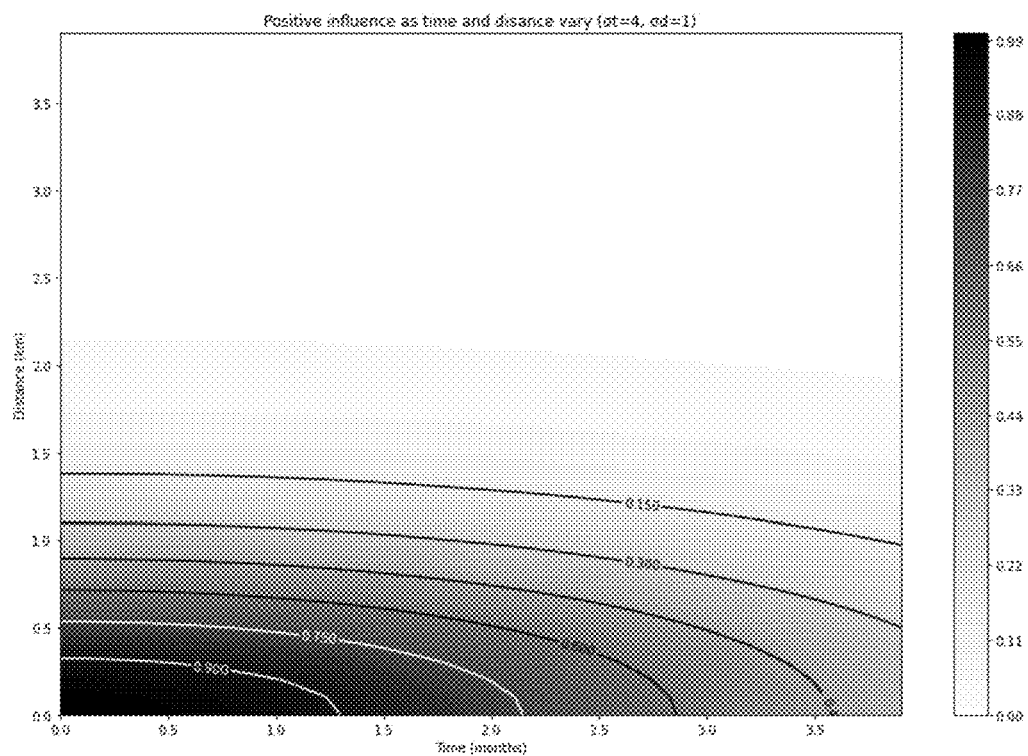
FIG. 3 is a plot showing a positive impact function according to an embodiment.

In some examples, the location verification module 130 may be configured to calculate the $$f(d, t, \sigma_d, \sigma_t) = \exp\left(-\frac{d^2}{(\sigma_d)^2} - \frac{t^2}{(\sigma_t)^2}\right)$$

positive impact factor based on a function $f(d,t,\sigma_d,\sigma_t)$:

FIG. 3 of the accompanying drawings shows a plot representing the function f for exemplary values $\sigma_d=3$ and $\sigma_t=4$, which may be suitable for, e.g., a cell tower.

Figure 4:
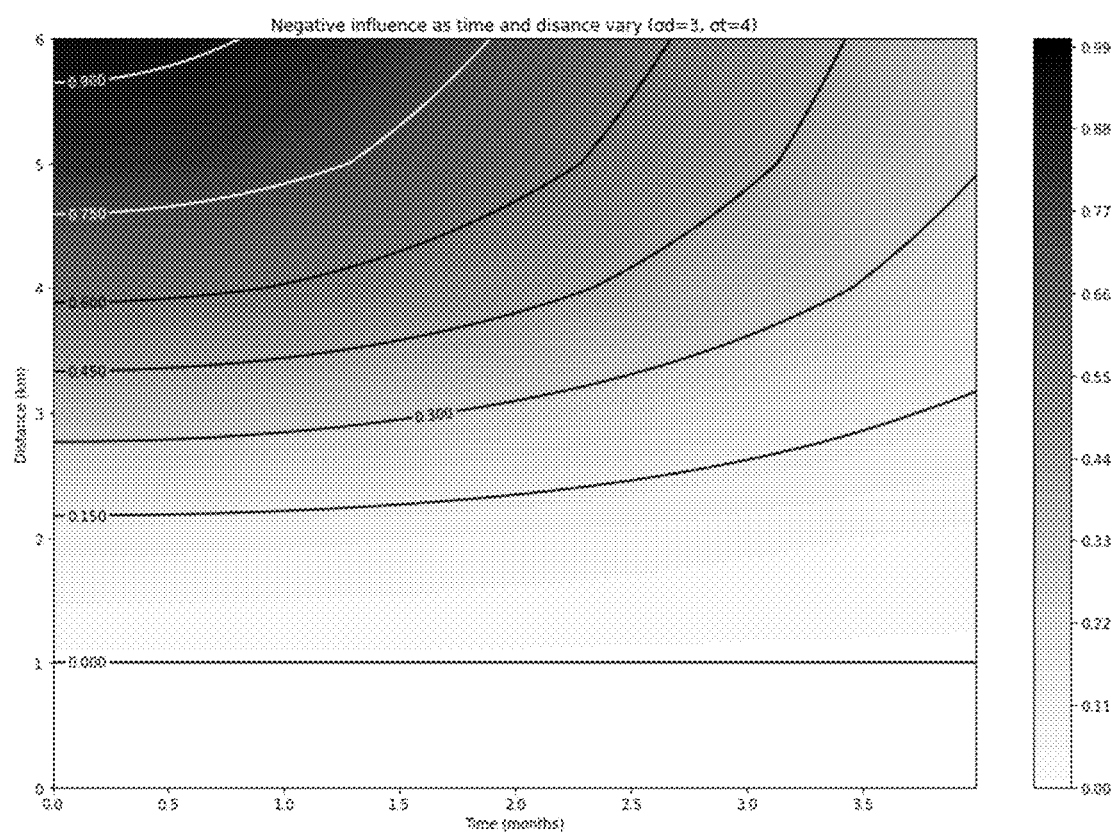
FIG. 4 is a plot showing a negative impact function according to an embodiment.

FIG. 4 of the accompanying drawings shows a plot representing the function f for exemplary values $\sigma_d=1$ and $\sigma_t=4$, which may be suitable for, e.g., a Wi-Fi network.

In some embodiments, the location verification module 130 may be configured to calculate the adjustment for each location report by calculating a negative impact factor for the location report.

In this way, the location verification module 130 can assess the extent to which each other location report conflicts with the provisional location. The adjustment for each location can account for the extent to which the location report conflicts with the provisional location.

In some embodiments, the negative impact factor may include 1 minus an exponential decay element based on the distance.

In this way, those devices which report a location furthest from the provisional location can provide the strongest conflict with the provisional location. In some examples, a negative impact factor is based on a distance between devices which is not consistent with the fact that the devices are present in the same network environment. When another device provides a location report which is very far from the provisional location, then the location report can be said to conflict with the provisional location more strongly than a location report for a device which is close. The negative impact factor including 1 minus an exponential decay factor can reflect this, by generating a smaller adjustment based on the location report which is closer and a larger adjustment for a location report which is further away. By utilising 1 minus an exponential decay element as a growth element, the negative impact factor is bounded by distance. In this way, there can be a diminishing effect due to increasing distance.

In some examples, the exponential decay element may be based on a higher power of the distance, e.g. a square or cube of the distance. Alternatively, in some examples, the negative impact factor may include an alternative bounded or unbounded growth element, e.g. a linear grown element, polynomial growth element, logarithmic growth element, logistic growth element or any other suitable growth element or combination of growth elements.

In some embodiments, if the calculated distance is below a threshold distance (u), the negative impact factor for the location report may be set at zero. In this way, an exclusion zone can be provided in which there is no negative impact factor. The exclusion zone can be set based on an expected variance in distances between devices in the first network environment.

In some embodiments, the distance may be offset by the threshold distance for the exponential decay element of the negative impact factor. In this way, the negative impact factor can be configured to grow with increasing distance starting from the threshold distance.

In some embodiments, the threshold distance may be preset based on a characteristic range associated with the first network environment 20. In this way, the exclusion zone can be made consistent with the technology limitations of the first network environment 20. For example, if the first network environment 20 is based on a cell tower, the threshold distance may define an exclusion zone for a distance of less than 50 kilometres.

In some embodiments, the location verification module 130 may be configured to calculating the negative impact factor based on a weighting factor calculated for the location report. In this way, the negative impact factor may account for other factors which affect or provide an indication of reliability for the location report. In this way, when a location report is considered to be more reliable, a larger adjustment can be made and vice versa.

In some embodiments, the weighing factor may be based on an elapsed time since the location report. In some examples, a longer elapsed time can increase the likelihood for inconsistent reports, e.g. when assumptions about the first network environment 20 are no longer valid. For example, a Wi-Fi network may be moved and re-installed at a new location, or cell tower designations may be updated or reassigned. In this way, a weighting factor based on elapsed time can account for expected inaccuracies over time.

In some examples, where a location report may be retrieved for another device currently in the first network environment 20, the location associated with the location report may have been determined by the other device at an earlier point in time. In some example, the other device may have changed location in the elapsed time since the location report. For example, a mobile device may have determined and reported its location at an earlier point in time corresponding to a previous use of a mapping application, or a previous social media check-in. In some examples, the other device may have reported a location outside the first network environment 20 before moving into the first network environment 20. In this way, a weighting factor based on elapsed time can account for an increasing uncertainty in the location report over time.

In some embodiments, the weighting factor may include an exponential time decay element based on the elapsed time. In this way, those devices which reported a location most recently can provide the strongest conflict against the provisional location. When a location report is very recent, then the location report can be said to conflict with the provisional location more strongly than a location report with a longer elapsed time. The exponential time decay element can reflect this, by generating a larger negative impact factor based on a recent location report which is recent and a smaller negative impact factor for an older location report.

In some examples, the exponential time decay element may be based on a higher power of the elapsed time, e.g. a square or cube of the elapsed time. In some examples, the weighting factor may be based on a Gaussian function. Alternatively, in some examples, the weighting factor may include an alternative time decay element, e.g. a linear decay element, polynomial decay element, logarithmic decay element, logistic decay element or any other suitable decay element or combination of decay elements.

In some examples, the exponential time decay element may include a time decay parameter ($\sigma_t$) to alter the rate of decay. For example, a time decay parameter may be based on a characteristic reliability associated with the first network environment 20 e.g. reflecting a likelihood that the parameters of the first network environment 20 will have changed over time. Alternatively, a time decay parameter may be based on a characteristic motion associated with the other device, e.g. reflecting a likelihood that a location of the device will have changed over time.

Figure 5:
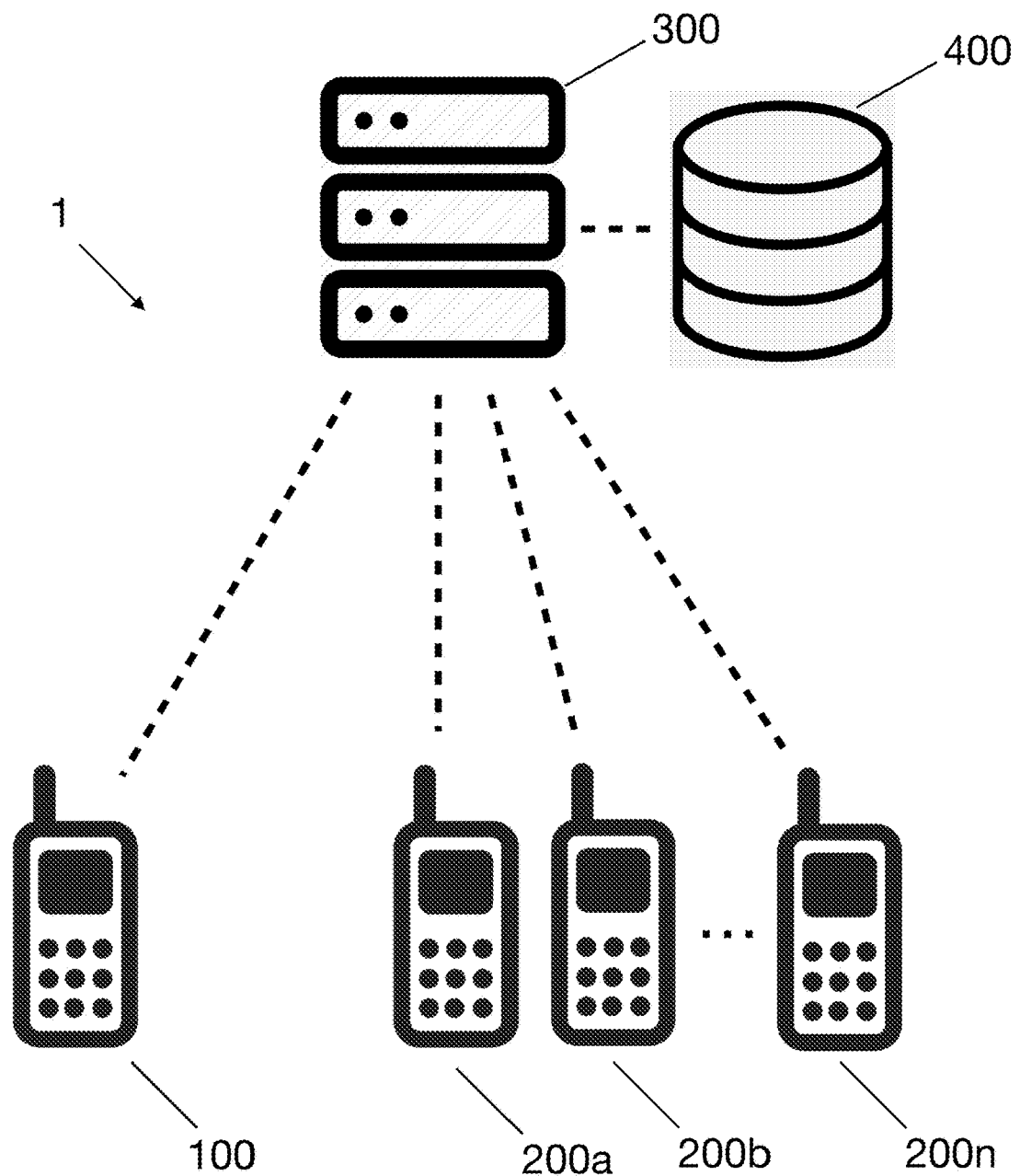
FIG. 5 is a schematic diagram showing a system according to an embodiment.

In some examples, the location verification module 130 may be configured to calculate the $$g(d, t, \sigma_d, \sigma_t, \mu) = \begin{cases} 0 & d \leq \mu \\ \exp\left(-\frac{t^2}{(\sigma_t)^2}\right)\left(1 - \exp\left(-\frac{(d-\mu)^2}{(\sigma_d)^2}\right)\right) & d > \mu \end{cases}$$

negative impact factor based on a function $g(d, t, \sigma_d, \sigma_t, u)$:

FIG. 5 of the accompanying drawings shows a plot representing the function g for exemplary values $\sigma_d=3$ and $\sigma_t=4$, which may be suitable for, e.g., a cell tower.

In some embodiments, the location verification module 130 may be configured to calculate the weighing factor of the adjustment based on an implicit location confidence based on a hardware configuration of the other device. For example, another device having an older hardware configuration may have a lower implicit location confidence in comparison with a newer hardware configuration which is implicitly more accurate. The weighting factor may be configured to give a stronger weighting to a location report associated with a newer, better or otherwise more accurate hardware configuration.

In this way, the location verification module 130 can integrate location reports from a variety of different devices utilising different location-based technologies with appropriately weighted adjustments.

In some embodiments, the weighing factor of the adjustment may be based on a previously generated location confidence value associated with the location report. For example, one or more other devices may also comprise a location verification module 130 configured to generate a location confidence value. In some examples, one or more location reports may have been previously generated based on a provisional location for another device and a location confidence value generated for the provisional location. In some examples, the weighting factor may be configured to give a stronger weighting to a location report associated with a higher location confidence value.

In some embodiments, the weighing factor of the adjustment may be based on a similarity between one or more environmental parameters measured by both of the mobile device 100 and the other device, where the environmental parameters include barometric pressure, ambient light and temperature. For example, environmental parameters measured by the both devices may support or conflict with the assertion that the devices are in a similar location. For example, if the distance between the provisional location and a location report is calculated as 1 km, a similar barometric pressure reading would support the provisional location, whereas a radically different barometric pressure reading would conflict with the provisional location. In some examples, the weighting factor may be configured to give a stronger weighting to a location report associated with similar environment factors.

In some embodiments, the location verification module 130 may be configured to set the adjustment for each location report as equal to the distance calculated for the location report.

For example, for each report a positive adjustment may be made based on the distance between the location in the location report and the provisional location. Alternatively, a negative adjustment may be made for each location report in the same way. In some embodiments, generating the output location confidence value may include calculating a mean adjustment value for all location reports and comparing the mean with a threshold distance.

In this way, an incorrect or spoofed provisional location can be identified because the distance to most or all of the other devices is significant larger than expected, causing the mean adjustment value to grow rapidly. In this way, an assessment of location confidence can be made using efficient processing operations, reducing the processing burden associated with location verification which may be particularly useful in the context of low-power devices e.g. Internet of things (IOT) devices.

By using the mean, the adjustment values can be normalised against the number of location reports, reducing anomalous results. The threshold distance may be preset based on a characteristic range associated with the first network environment. In this way, the output location confidence value can indicate when the mean distance between devices is beyond the technological capability of the first network environment 20.

In some embodiments, the output location confidence value may have a binary value. The binary value may indicate that the provisional location is verified or not verified. For example, if the mean is less than the threshold distance, the binary value may indicate that the provisional location is verified. If the mean is greater than the threshold distance, the binary value may indicate that the provisional location is not verified. In this way, the location confidence value can give a clear indication of whether or not a provisional location can be trusted. Alternatively, in some examples, a plurality of different thresholds may be set, with a corresponding scale of location confidence values.

In some embodiments, the location verification module 130 may be configured to determine a second network environment of the mobile device 100. For example, the mobile device 100 may be connected to a plurality of local or wide-area network environments through the network interface 120 or another hardware or software interface. For example, in addition to the first network environment 20, the mobile device 100 may be connected to a second network environment via Bluetooth, Wi-Fi, a wired local area network or a cellular network tower. In some embodiments, the location verification module 130 may be configured to receive one or more location reports each including a location for another device in the second network environment. In this way, a large number and a wider variety of location reports may be received and a larger number of adjustments made, leading to a more accurate location confidence value. In some examples, adjustments may be weighted differently in a number of ways, as described above, according to the network environment of the location report. For example, a distance weighting or decay element may be based on a characteristic range associated with the network environment, as described above.

In some embodiments, the location verification module 130 may be configured to determine a neighbouring network environment adjacent to the first network environment 20, wherein the mobile device 100 is not connected to the neighbouring network environment. For example, where the first network environment 20 is a cell tower of a cellular network, a neighbouring network environment may be an adjacent cell tower. The neighbouring network environment may be part of the same network as the first network environment 20 e.g. cell towers in the same cellular network, or Wi-Fi routers in the same mesh network. In some examples, the mobile device 100 may not be connected to the neighbouring cell tower because it is out of range, or because a selection has been made to connect only to the closer cell tower of the first network environment 20.

In some embodiments, the location verification module 130 may be configured to receive one or more location reports each including a location for another device in the neighbouring network environment. In this way, a greater number of location reports can be received, to generate a more accurate location confidence value. In some implementations, the location reports from the neighbouring network environment may be received by a server, or the location reports may be received directly by the mobile device 100 if the second network environment is within range but not connected, or the location reports may be received indirectly by the mobile device 100 e.g. via the first and second network environments.

In some embodiments, calculating the adjustment for each location report from the neighbouring network environment may be based on a displacement factor calculated for the neighbouring network environment. In this way, an adjustment for a location report from a neighbouring network environment can be weighted to reflect a greater uncertainty. For example, because the neighbouring network environment is adjacent and not co-located with the first network environment, then the location report is expected to be close to the provisional location but can also be expected to be further away than a location report from the first network environment. In this way, the location reports from a neighbouring network environment cannot support the provisional location as strongly, but can collectively improve the accuracy of the location confidence value due to the greater number of location reports available.

In some embodiments, the displacement factor may be based on a distance between the first network environment 20 and the neighbouring network environment. In this way, the displacement factor can account for variations in the distance between the network environments. For example, the distance to an adjacent network environment may vary considerably based on the technology of the network environments, or a placement/coverage strategy for the network. In this way, the adjustment for each location report can provide stronger support for the provisional location or conflict with the provisional location, according to the displacement factor.

In some embodiments, the distance between network environments may be based on a distance between a base station of the first network environment 20 and a base station of the neighbouring network environment. For example, the distance between the network environments of two adjacent cell may be based on the distance between the cell towers. The distance between the network environments of two adjacent Wi-Fi networks in a mesh network may be based on the distance between the two associated Wi-Fi routers.

In some embodiments, the provisional location may be received as metadata associated with a primary data capture by the mobile device 100. In this way, a location confidence value may be generated for each primary data capture. For example, a primary data capture may include an image capture, audio capture, video capture or any other data capture by the mobile device 100. The provisional location associated with the primary data capture can be verified and, in this way, the reliability of the primary data itself can be verified. In some examples, the location confidence value may be generated automatically in response to a primary data capture. In some examples, the location confidence value may be attached to the primary data captured by the mobile device 100, e.g. as metadata of the primary data.

FIG. 5 of the accompanying drawings shows a schematic diagram of a system 1 according to an embodiment. The system 1 comprises a mobile device 100, one or more other devices 200n, a server 300 and a database 400.

In some embodiments, the server 300 may comprise a location verification module configured in a similar fashion to the location verification module 130 described with respect to FIG. 1. In some embodiments, the mobile device 100 may not include the location verification module 130.

In some embodiments, the server 300 may be configured to receive the provisional location from the mobile device 100. In some embodiments, the provisional location may be received as metadata associated with a primary data capture by the mobile device 100.

In some embodiments, the server 300 may receive location reports for the one or more other devices 200n by retrieving one or more stored location reports from the database 400. In this way, location reports may be accessed over a large area, a large number and variety of devices, and over a longer period of time. Alternatively, in some embodiments the server 300 may provide one or more location reports from the database 400 to the location verification module 130 of the mobile device 100. In some examples, location reports in the data may be anonymised. In some examples, analysis or pre-processing may be carried out on the location reports stored in the database. For example, when additional metadata is provided with the location report which can be used to generate one or more weightings (e.g. hardware configuration or previous location confidence value, as described above) these may be analysed or pre-processed to generate a weighting in advance. In this way, the processing requirements on the location verification module can be reduced.

Alternatively, in some embodiments, the server 300 may receive the location reports for the other devices 200n by requesting reports from the one or more other devices 200n in the first network environment. In this way, the relevance of the received location reports can be improved by increasing the likelihood that the received location reports are more recent. In some examples, one or more of the other devices 200n may generate a new location report in response to the request, ensuring that the generated location report is current. Alternatively, in some embodiments, the request may be sent by the location verification module 130 of the mobile device 100. In this way, the provisional location can be verified by the mobile device 100 itself, based on data from nearby devices 200n. This can allow location verification to take place in a decentralised fashion. In some embodiments, some or all of the mobile device 100, 200n may not be connected to the server 300.

In some embodiments, the server 300 may be configured to provide the provisional location to the database 400 for storage as a location report, based on the output location confidence value for the provisional location. In this way, the database 400 of location reports used for location verification can be grown over time, increasing the accuracy of location verification over time. Alternatively, in some embodiments, the location verification module 130 of the mobile device 100 may be configured to provide the provisional location to the database 400 via the server 300. In some examples, the provisional location may be provided as a location report if the output location confidence value is above a predetermined threshold. In this way, the accuracy or trustworthiness of location reports in the database 400 can be maintained. In some examples, the provisional location report may be stored as a location report with one or more additional metadata items including, for example, the associated location confidence value, time, hardware configuration or environmental parameters.

Figure 6:
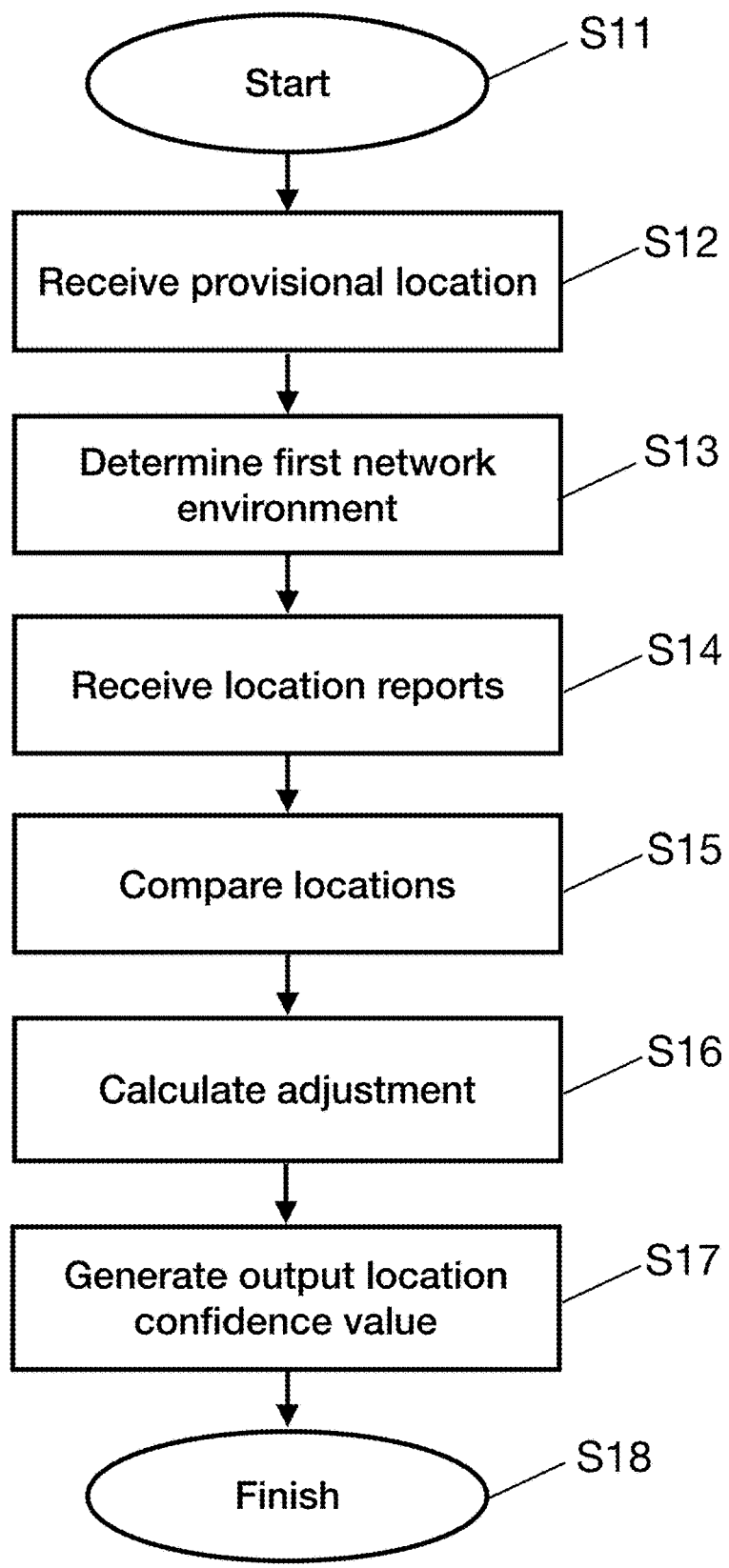
FIG. 6 is a flowchart showing a method according to an embodiment.

FIG. 6 of the accompanying drawings shows a flowchart representing a method of classification according to an embodiment. The method starts at step S11.

At step S12, the method comprises receiving a provisional location for a first device. In some examples, the provisional location may be received from a localisation module of the first device. In some examples, the provision location may be based on, for example, the output from a GPS or GLONASS module, a Bluetooth or Near-Field Communication (NFC) beacon or the result of an image recognition algorithm based on a captured image.

In some embodiments, the provisional location may be received as metadata associated with a primary data capture by the first device. In this way, a location confidence value may be generated for each primary data capture. For example, a primary data capture may include an image capture, audio capture, video capture or any other data capture by the first device. The provisional location associated with the primary data capture can be verified and, in this way, the reliability of the primary data itself can be verified. In some examples, the location confidence value may be generated automatically in response to a primary data capture. In some examples, the location confidence value may be attached to the primary data captured by the first device, e.g. as metadata of the primary data.

The method may further include setting a baseline location confidence value for the provisional location. In some examples, the baseline location confidence value may be 0. In some examples, where the location confidence value is bound to a range, e.g. between 0 and 1, the baseline value may be set as a value within the range e.g. 0.5 or 0.7. In this way, the baseline value defines an initial trustworthiness of the provisional location, with room for the location confidence value to be adjusted in a positive or negative direction. Alternatively, in some examples the baseline value may be set at the top of the range e.g. at 1. Alternatively, in some examples, an explicit baseline value may not be set, and a first adjustment to the location confidence value may be considered as the baseline.

At step S13, the method comprises determining a first network environment of the first device. The first device may be connected to one or more local or wide-area network environments. For example, the first device may be connected to a network via Bluetooth, Wi-Fi, a wired local area network or a cellular network tower. Where the first device is connected to a plurality of network environments, the first network environment may be selected according to a range, number of devices, stability, mobility or any other criterion associated with the network environment.

In some embodiments, the method may further include determining a second network environment of the first device. For example, the first device may be connected to a plurality of local or wide-area network environments. For example, in addition to the first network environment, the first device may be connected to a second network environment via Bluetooth, Wi-Fi, a wired local area network or a cellular network tower. In some embodiments, the method may include receiving one or more location reports each including a location for another device in the second network environment. In this way, a large number and a wider variety of location reports may be received and a larger number of adjustments made, leading to a more accurate location confidence value. In some examples, adjustments may be weighted differently in a number of ways, as described above, according to the network environment of the location report. For example, a distance weighting or decay element may be based on a characteristic range associated with the network environment, as described above.

In some embodiments, the method may include determining a neighbouring network environment adjacent to the first network environment, wherein the first device is not connected to the neighbouring network environment. For example, where the first network environment is a cell tower of a cellular network, a neighbouring network environment may be an adjacent cell tower. The neighbouring network environment may be part of the same network as the first network environment e.g. cell towers in the same cellular network, or Wi-Fi routers in the same mesh network. In some examples, the first device may not be connected to the neighbouring cell tower because it is out of range, or because a selection has been made to connect only to the closer cell tower of the first network environment.

At step S14, the method comprises receiving one or more location reports each including a location for another device in the first network environment. In some examples, the location report may be received with one or more additional metadata items including, for example, an associated location confidence value, a measurement time, a hardware configuration of the other device or one or more environmental parameters.

In some embodiments, receiving the location reports may include requesting reports from one or more other devices in the first network environment. In this way, the relevance of the received location reports can be improved by increasing the likelihood that the received location reports are more recent. In some examples, one or more of the other devices may generate a new location report in response to the request, ensuring that the generated location report is current. In some implementations, the request may be sent by the first device executing the method. In this way, the provisional location can be verified by the device itself, based on data from nearby peer devices. This can allow location verification to take place in a decentralised fashion. Alternatively, in some implementations a central server may send the request to the other devices.

In some embodiments, receiving the location reports may include retrieving one or more stored location reports from a database. In this way, location reports may be accessed over a large area, a large number and variety of devices, and over a longer period of time. In some examples, location reports in the data may be anonymised. In some examples, analysis or pre-processing may be carried out on the location reports stored in the database. For example, when additional metadata is provided with the location report which can be used to generate one or more weightings (e.g. hardware configuration or previous location confidence value, as described in more detail below) these may be analysed or pre-processed to generate a weighting in advance. In this way, the processing requirements at the time of executing the method can be reduced.

In some embodiments, the method may include receiving one or more location reports each including a location for another device in the neighbouring network environment. In this way, a greater number of location reports can be received, to generate a more accurate location confidence value. In some implementations, the location reports from the neighbouring network environment may be received by a server, or the location reports may be received directly by the first device if the second network environment is within range but not connected, or the location reports may be received indirectly by the first device e.g. via the first and second network environments.

At step S15, the method comprises, for each received location report, comparing the location in the location report and the provisional location of the first device and calculating a distance. In some examples, the distance may be calculated as a Euclidean or Pythagorean distance directly between the two locations.

At step S16, the method comprises for each received location report, calculating an adjustment to the location confidence value of the first device. In some examples, the adjustment can be positive or negative. In some examples, the magnitude and direction of the adjustment can be based on the extent to which the location report supports or conflicts with the provisional location. For example, another device in the first network environment can be expected to share certain characteristics with the first device, for example, a similar geographic location or physical environment. As such, a location report having a similar geographic location to the provisional location may be said to support the provisional location. A location report having a significantly different geographic location to the provisional location may be said to conflict with the provisional location.

According to an embodiment, the adjustment is based on the calculated distance. For example, a device which reports a location at a short distance from the provisional location may provide support for the provisional location, and a device which reports a location at a long distance from the provisional location may conflict with the provisional location. In some examples, an extent or magnitude of the adjustment may be based on the calculated distance.

For example, if the distance is very short, then the location report can be said to support the provisional location more strongly than if the distance is longer.

In some embodiments, calculating the adjustment for each location report may include calculating a positive impact factor for the location report.

In this way, the method can assess the extent to which each other location report supports the provisional location. The adjustment for each location can account for the extent to which the location report supports the provisional location.

In some embodiments, the positive impact factor may include an exponential decay element based on the distance.

In this way, those devices which report a location closest to the provisional location can provide the strongest support for the provisional location. In some examples, a positive impact factor is based on a distance between devices which is consistent with the fact that the devices are present in the same network environment. When another device provides a location report which is very close to the provisional location, then the location report can be said to support the provisional location more strongly than a location report for a device which is further away. The exponential decay element can reflect this, by generating a larger adjustment based on the location report which is closer and a smaller adjustment for a location report which is further away.

In some examples, the exponential decay element may be based on a higher power of the distance, e.g. a square or cube of the distance. In some examples, the positive impact factor may be based on a Gaussian function. Alternatively, in some examples, the positive impact factor may include an alternative decay element, e.g. a linear decay element, polynomial decay element, logarithmic decay element, logistic decay element or any other suitable decay element or combination of decay elements.

In some embodiments, the exponential decay element may include a decay parameter to alter the rate of decay based on a characteristic range associated with the first network environment.

In this way, the positive impact factor of the adjustment can be made consistent with the technology limitations of the network environment. In some examples, where a plurality of network environments are considered, the decay parameter may allow the integration of location reports based on different network environments. In some examples, a positive impact factor is based on a distance between devices which is consistent with the fact that the devices are present in the same network environment. For example, a distance of 50 metres may strongly support the provisional location if the first network environment is based on a cell tower, based on a characteristic range of the cell tower. The same distance of 50 metres may not strongly support the provisional location if the first network environment is a Wi-Fi network, based on a characteristic range of the Wi-Fi network which is shorter than the cell tower. The decay parameter can reflect this, by providing a rate of decay suitable for the characteristic range of the first network environment.

In some embodiments, calculating the adjustment for each location report may include calculating a negative impact factor for the location report.

In this way, the method can assess the extent to which each other location report conflicts with the provisional location. The adjustment for each location can account for the extent to which the location report conflicts with the provisional location.

In some embodiments, the negative impact factor may include 1 minus an exponential decay element based on the distance.

In this way, those devices which report a location furthest from the provisional location can provide the strongest conflict with the provisional location. In some examples, a negative impact factor is based on a distance between devices which is not consistent with the fact that the devices are present in the same network environment. When another device provides a location report which is very far from the provisional location, then the location report can be said to conflict with the provisional location more strongly than a location report for a device which is close. The negative impact factor including 1 minus an exponential decay factor can reflect this, by generating a smaller adjustment based on the location report which is closer and a larger adjustment for a location report which is further away. By utilising 1 minus an exponential decay element as a growth element, the negative impact factor is bounded by distance. In this way, there can be a diminishing effect due to increasing distance.

In some examples, the exponential decay element may be based on a higher power of the distance, e.g. a square or cube of the distance. Alternatively, in some examples, the negative impact factor may include an alternative bounded or unbounded growth element, e.g. a linear grown element, polynomial growth element, logarithmic growth element, logistic growth element or any other suitable growth element or combination of growth elements.

In some embodiments, if the calculated distance is below a threshold distance, the negative impact factor for the location report may be set at zero. In this way, an exclusion zone can be provided in which there is no negative impact factor. The exclusion zone can be set based on an expected variance in distances between devices in the first network environment.

In some embodiments, the distance may be offset by the threshold distance for the exponential decay element of the negative impact factor. In this way, the negative impact factor can be configured to grow with increasing distance starting from the threshold distance.

In some embodiments, the threshold distance may be preset based on a characteristic range associated with the first network environment. In this way, the exclusion zone can be made consistent with the technology limitations of the network environment. For example, if the first network environment is based on a cell tower, the threshold distance may define an exclusion zone for a distance of less than 50 kilometres.

In some embodiments, calculating the adjustment for each location report may be further based on a weighting factor calculated for the location report. In this way, the adjustment may account for other factors which affect or provide an indication of reliability for the location report. In this way, when a location report is considered to be more reliable, a larger adjustment can be made and vice versa.

In some embodiments, the weighing factor may be based on an elapsed time since the location report. In some examples, a longer elapsed time can increase the likelihood for inconsistent reports, e.g. when assumptions about the network environment are no longer valid. For example, a Wi-Fi network may be moved and re-installed at a new location, or cell tower designations may be updated or reassigned. In this way, a weighting factor based on elapsed time can account for expected inaccuracies over time.

In some examples, where a location report may be retrieved for another device currently in the first network, the location associated with the location report may have been determined by the other device at an earlier point in time. In some example, the other device may have changed location in the elapsed time since the location report. For example, a mobile device may have determined and reported its location at an earlier point in time corresponding to a previous use of a mapping application, or a previous social media check-in. In some examples, the other device may have reported a location outside the first network environment before moving into the first network environment. In this way, a weighting factor based on elapsed time can account for an increasing uncertainty in the location report over time.

In some embodiments, the weighting factor may include an exponential time decay element based on the elapsed time. In this way, those devices which reported a location most recently can provide the strongest support for the provisional location. When a location report is very recent, then the location report can be said to support the provisional location more strongly than a location report with a longer elapsed time. The exponential time decay element can reflect this, by generating a larger adjustment based on a recent location report which is recent and a smaller adjustment for an older location report.

In some examples, the exponential time decay element may be based on a higher power of the elapsed time, e.g. a square or cube of the elapsed time. In some examples, the weighting factor may be based on a Gaussian function. Alternatively, in some examples, the weighting factor may include an alternative time decay element, e.g. a linear decay element, polynomial decay element, logarithmic decay element, logistic decay element or any other suitable decay element or combination of decay elements.

In some examples, the exponential time decay element may include a time decay parameter to alter the rate of decay. For example, a time decay parameter may be based on a characteristic reliability associated with the first network environment e.g. reflecting a likelihood that the parameters of network environment will have changed over time. Alternatively, a time decay parameter may be based on a characteristic motion associated with the other device, e.g. reflecting a likelihood that a location of the device will have changed over time.

In some embodiments, the weighing factor of the adjustment may be based on an implicit location confidence based on a hardware configuration of the other device. For example, another device having an older hardware configuration may have a lower implicit location confidence in comparison with a newer hardware configuration which is implicitly more accurate. The weighting factor may be configured to give a stronger weighting to a location report associated with a newer, better or otherwise more accurate hardware configuration. In this way, location reports from a variety of different devices utilising different location-based technologies can be integrated with appropriately weighted adjustments.

In some embodiments, the weighing factor of the adjustment may be based on a previously generated location confidence value associated with the location report. For example, one or more other devices may have previously used the present method to generate a location confidence value. In some examples, one or more location report may have been previously generated based on a provisional location for another device and a location confidence value generated for the provisional location. In some examples, the weighting factor may be configured to give a stronger weighting to a location report associated with a higher location confidence value.

In some embodiments, the weighing factor of the adjustment may be based on a similarity between one or more environmental parameters measured by both of the first device and the other device, where the environmental parameters include barometric pressure, ambient light and temperature. For example, environmental parameters measured by the both devices may support or conflict with the assertion that the devices are in a similar location. For example, if the distance between the provisional location and a location report is calculated as 1 km, a similar barometric pressure reading would support the provisional location, whereas a radically different barometric pressure reading would conflict with the provisional location. In some examples, the weighting factor may be configured to give a stronger weighting to a location report associated with similar environment factors.

In some embodiments, calculating the adjustment for each location report from the neighbouring network environment may be based on a displacement factor calculated for the neighbouring network environment. In this way, an adjustment for a location report from a neighbouring network environment can be weighted to reflect a greater uncertainty. For example, because the neighbouring network environment is adjacent and not co-located with the first network environment, then the location report is expected to be close to the provisional location but can also be expected to be further away than a location report from the first network environment. In this way, the location reports from a neighbouring network environment cannot support the provisional location as strongly, but can collectively improve the accuracy of the location confidence value due to the greater number of location reports available.

In some embodiments, the displacement factor may be based on a distance between the first network environment and the neighbouring network environment. In this way, the displacement factor can account for variations in the distance between the network environments. For example, the distance to an adjacent network environment may vary considerably based on the technology of the network environment, or a placement/coverage strategy for the network. In this way, the adjustment for each location report can provide stronger support for the provisional location or conflict with the provisional location, according to the displacement factor.

In some embodiments, the distance between network environments may be based on a distance between a base station of the first network environment and a base station of the neighbouring network environment. For example, the distance between the network environments of two adjacent cell may be based on the distance between the cell towers. The distance between the network environments of two adjacent Wi-Fi networks in a mesh network may be based on the distance between the two associated Wi-Fi routers.

At step S17, the method comprises generating an output location confidence value for the provisional location of the first device. According to an embodiment, the output location confidence value is based on the baseline location confidence value and the adjustment calculated for each received location report. In some examples, generating the output location confidence value comprises applying the calculated adjustment to the baseline location confidence value. In some examples, the adjustment may be added to, or subtracted from the baseline value. In some examples, a plurality of adjustments based on different location reports may be made collectively to the baseline value. In some examples, one or more adjustments may be made sequentially to the baseline value or the most recent value of the location confidence value.

In this way, it is possible to verify the provisional location provided by a device. The output location confidence value can be adjusted based on evidence from other devices, according to whether the evidence supports or does not support the provisional location. The location confidence value can therefore enable the identification of a device reporting a false provisional location. For instance, if a device provides a provisional location in a certain geographical location but other devices in the same network environment have provided location reports with significantly different geographical locations, then the adjustments made for each of the other location reports will cumulatively reduce the location confidence value of the provisional location until it can be clearly identified as a false location. On the other hand, the location confidence value can enable the identification of a device reporting a trustworthy provisional location, as the adjustments made for each other location report will cumulatively support the provisional location. The generation of the output location confidence value can provide a numerical evaluation of the trustworthiness of a provisional location, which can be assessed, compared or ranked as a numerical metric.

In some embodiments, the adjustment for each location report may be equal to the distance calculated for the location report. For example, for each report a positive adjustment may be made based on the distance between the location in the location report and the provisional location.

Alternatively, a negative adjustment may be made for each location report in the same way. In some embodiments, generating the output location confidence value may include calculating a mean adjustment value for all location reports and comparing the mean with a threshold distance. In this way, an incorrect or spoofed provisional location can be identified because the distance to most or all of the other devices is significant larger than expected, causing the mean adjustment value to grow rapidly. In this way, an assessment of location confidence can be made using efficient processing operations, reducing the processing burden associated with location verification which may be particularly useful in the context of low-power devices e.g. Internet of things (IOT) devices.

By using the mean, the adjustment values can be normalised against the number of location reports, reducing anomalous results. The threshold distance may be preset based on a characteristic range associated with the first network environment. In this way, the the output location confidence value can indicate when the mean distance between devices is beyond the technological capability of the network environment.

In some embodiments, the output location confidence value may have a binary value. The binary value may indicate that the provisional location is verified or not verified. For example, if the mean is less than the threshold distance, the binary value may indicate that the provisional location is verified. If the mean is greater than the threshold distance, the binary value may indicate that the provisional location is not verified. In this way, the location confidence value can give a clear indication of whether or not a provisional location can be trusted. Alternatively, in some examples, a plurality of different thresholds may be set, with a corresponding scale of location confidence values.

In some embodiments, the method may include, based on the output location confidence value for the provisional location, providing the provisional location to a database for storage as a location report. In this way, the database of location reports used for location verification can be grown over time, increasing the accuracy of location verification over time. In some examples, the provisional location may be provided as a location report if the output location confidence value is above a predetermined threshold. In this way, the accuracy or trustworthiness of location reports in the database can be maintained. In some examples, the provisional location report may be stored as a location report with one or more additional metadata items including, for example, the associated location confidence value, time, hardware configuration or environmental parameters.

The method finishes step at S18.

In some embodiments, a computer-readable medium comprises instructions which, when executed by a processor, cause the processor to perform the method of FIG. 3.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the scope of the invention as defined by the appended claims.

The invention claimed is:

1. A computer implemented method of verifying a device location, comprising:
receiving a provisional location for a first device;
setting a baseline location confidence value for the provisional location;
determining a first network environment of the first device;
receiving one or more location reports each including a location for another device in the first network environment;
for each received location report:
comparing the location in the location report and the provisional location of the first device and calculating a distance; and
calculating an adjustment to the location confidence value of the first device based on the calculated distance; and
generating an output location confidence value for the provisional location of the first device based on the baseline location confidence value and the adjustment calculated for each received location report.

2. The method of claim 1, wherein calculating the adjustment for each location report comprises calculating a positive impact factor for the location report.

3. The method of claim 2, wherein the positive impact factor includes an exponential decay element based on the distance.

4. The method of claim 3, wherein the exponential decay element includes a decay parameter to alter the rate of decay based on a characteristic range associated with the first network environment.

5. The method of claim 1, wherein calculating the adjustment for each location report comprises calculating a negative impact factor for the location report.

6. The method of claim 5, wherein the negative impact factor includes 1 minus an exponential decay element based on the distance.

7. The method of claim 6, wherein the distance is offset by a threshold distance for the exponential decay element and, if the calculated distance is below the threshold distance, the negative impact factor for the location report is set at zero.

8. The method of claim 7, wherein the threshold distance is preset based on a characteristic range associated with the first network environment.

9. The method of claim 1, wherein calculating the adjustment for each location report is further based on a weighting factor calculated for the location report, wherein the weighing factor is based on one or more of:
an elapsed time since the location report;
an implicit location confidence based on a hardware configuration of the other device;
a previously generated location confidence value associated with the location report; and
a similarity between one or more environmental parameters measured by both of the first device and the other device, where the environmental parameters include barometric pressure, ambient light and temperature.

10. The method of claim 9, wherein the weighting factor includes an exponential decay element based on the elapsed time.

11. The method of claim 1, wherein the adjustment for each location report is equal to the distance calculated for the location report, and generating the output location confidence value comprises calculating a mean adjustment value for all location reports and comparing the mean with a threshold distance.

12. The method of claim 11, wherein the output location confidence value has a binary value which indicates that the provisional location is verified if the mean is less than the threshold distance, and not verified if the mean is greater than the threshold distance.

13. The method of claim 1, wherein receiving the location reports includes requesting reports from one or more other devices in the first network environment and/or retrieving one or more stored location reports from a database.

14. The method of claim 1, further comprising, based on the output location confidence value for the provisional location, providing the provisional location to a database for storage as a location report.

15. The method of claim 1, further comprising:
determining a second network environment of the first device; and
receiving one or more location reports each including a location for another device in the second network environment.

16. The method of claim 1, further comprising:
determining a neighbouring network environment adjacent to the first network environment, wherein the first device is not connected to the neighbouring network environment; and
receiving one or more location reports each including a location for another device in the neighbouring network environment;
wherein calculating the adjustment for each location report from the neighbouring network environment is further based on a displacement factor calculated for the neighbouring network environment, wherein the displacement factor is based on a distance between the first network environment and the neighbouring network environment.

17. The method of claim 16, wherein the distance between network environments is based on a distance between a base station of the first network environment and a base station of the neighbouring network environment.

18. The method of claim 1, wherein the provisional location is received as metadata associated with a primary data capture by the first device.

19. A non-transitory computer-readable medium comprising instructions which, when executed by a processor, cause the processor to perform the method of claim 1.

20. A mobile device comprising:
a global positioning module configured to determine a location of the mobile device; and
the location verification module of claim 19;
wherein the provision location for the first device is the determined location of the mobile device; and
wherein the mobile device is configured to receive the one or more location reports from a server and/or one or more other devices in the first network environment.

21. A server comprising the location verification module of claim 19 and configured to communicate with at least one device in the first network environment.

22. A location verification module, comprising one or more processors configured to perform the method of claim 1.

* * * * *